United States Patent
Kim et al.

(10) Patent No.: US 12,152,948 B2
(45) Date of Patent: Nov. 26, 2024

(54) PRESSURE SENSOR COMPRISING SENSING THREAD PASSING THROUGH A THROUGH-HOLE

(71) Applicant: KOREA ELECTRONICS TECHNOLOGY INSTITUTE, Seongnam-si (KR)

(72) Inventors: Won Hyo Kim, Yongin-si (KR); Woo Kyeong Seong, Seongnam-si (KR); Kook Nyung Lee, Seoul (KR); Su Mi Yoon, Anyang-si (KR); Dong Ki Hong, Pyeongtaek-si (KR); Young Joo Kim, Seoul (KR); Hye Lim Kang, Chungcheongbuk-do (KR)

(73) Assignee: Korea Electronics Technology Institute, Seongnam-si (KR)

( * ) Notice: Subject to any disclaimer, the term of this patent is extended or adjusted under 35 U.S.C. 154(b) by 290 days.

(21) Appl. No.: 17/684,156

(22) Filed: Mar. 1, 2022

(65) Prior Publication Data

US 2022/0187144 A1    Jun. 16, 2022

Related U.S. Application Data

(63) Continuation of application No. PCT/KR2020/008574, filed on Jul. 1, 2020.

(30) Foreign Application Priority Data

Sep. 3, 2019   (KR) .................. 10-2019-0109152

(51) Int. Cl.
*G01L 1/20* (2006.01)
*G01L 9/02* (2006.01)
*G01L 9/12* (2006.01)

(52) U.S. Cl.
CPC .......... *G01L 1/20* (2013.01); *G01L 9/02* (2013.01); *G01L 9/12* (2013.01)

(58) Field of Classification Search
CPC .. D03D 15/533; D03D 1/0082; D03D 1/0088; G01L 1/2287; G01L 1/205
See application file for complete search history.

(56) References Cited

U.S. PATENT DOCUMENTS

| | | | |
|---|---|---|---|
| 7,348,285 B2 * | 3/2008 | Dhawan .............. | D02G 3/441 442/4 |
| 9,322,121 B2 * | 4/2016 | Dunne .................. | G01B 7/18 |

(Continued)

FOREIGN PATENT DOCUMENTS

| | | | | |
|---|---|---|---|---|
| EP | 3736528 B1 * | 5/2023 | .......... | A61B 5/0205 |
| JP | H-10-132677 A | 5/1998 | | |

(Continued)

OTHER PUBLICATIONS

European Search Report dated Sep. 7, 2023 in European Application No. 20861328.1.

(Continued)

*Primary Examiner* — Tran M. Tran
(74) *Attorney, Agent, or Firm* — Knobbe, Martens, Olson & Bear, LLP

(57) ABSTRACT

A sensor includes a base material and a through-hole formed to pass through the upper surface and the lower surface of the base material. The sensor may also include a conductive thread sensor including conductive thread that passes through the through-hole. The pressure sensor is implemented through a structural combination of the conductive thread and the base material so that the degree of design freedom can be effectively increased in the application of a variety of recent wearable flexible materials.

19 Claims, 8 Drawing Sheets

(56) References Cited

U.S. PATENT DOCUMENTS

| | | | |
|---|---|---|---|
| 9,695,530 B2* | 7/2017 | Hall | D04D 1/04 |
| 9,733,136 B2* | 8/2017 | Seitz | D04B 21/14 |
| 9,816,799 B2* | 11/2017 | Keller | G01B 7/18 |
| 10,338,755 B2* | 7/2019 | Podhajny | G06F 3/045 |
| 10,499,502 B2* | 12/2019 | de Kok | H01R 12/77 |
| 10,736,542 B2* | 8/2020 | Krimmer | A43B 13/12 |
| 10,827,611 B2* | 11/2020 | Sugita | D02G 3/12 |
| 10,925,540 B2* | 2/2021 | Berg | A61B 5/6804 |
| 11,470,718 B2* | 10/2022 | Hashiguchi | H01B 7/0846 |
| 11,841,281 B2* | 12/2023 | Greenspan | G01L 1/18 |
| 2015/0168238 A1* | 6/2015 | Raut | G01N 27/223 |
| | | | 702/42 |
| 2016/0194792 A1* | 7/2016 | Satharasinghe | D04B 1/102 |
| | | | 428/102 |
| 2017/0347721 A1* | 12/2017 | Greenspan | D05B 97/08 |
| 2018/0003579 A1 | 1/2018 | Esposito et al. | |
| 2018/0159532 A1 | 6/2018 | Pohl et al. | |
| 2018/0202875 A1* | 7/2018 | Ibrocevic | G01L 1/2287 |
| 2018/0330886 A1* | 11/2018 | Gisby | H01G 5/04 |
| 2018/0332702 A1 | 11/2018 | Nakajima et al. | |
| 2019/0072440 A1* | 3/2019 | Menon | D03D 1/0088 |
| 2022/0056634 A1* | 2/2022 | McMurray | A61L 17/04 |
| 2022/0252472 A1* | 8/2022 | Kim | G01L 1/18 |
| 2022/0357220 A1* | 11/2022 | Uragami | G01L 5/0038 |

FOREIGN PATENT DOCUMENTS

| | | |
|---|---|---|
| JP | 2018-112489 A | 7/2018 |
| KR | 10-1301277 B1 | 8/2013 |
| KR | 10-1716695 B1 | 3/2017 |
| KR | 10-2017-0069673 A | 6/2017 |
| KR | 10-2019-0057813 A | 5/2019 |
| KR | 10-2019-0060440 A | 6/2019 |
| WO | WO 2015/014950 A1 | 2/2015 |
| WO | WO 2016/114674 A1 | 7/2016 |

OTHER PUBLICATIONS

Office Action dated Jan. 26, 2021 in Korean Application No. 10-2019-0109152.

International Search Report mailed Sep. 23, 2020 in International Application No. PCT/KR2020/008574.

* cited by examiner

PRESSURE SENSOR COMPRISING SENSING THREAD PASSING THROUGH A THROUGH-HOLE

CROSS REFERENCE TO RELATED APPLICATIONS

This is a continuation application of International Patent Application No. PCT/KR2020/008574, filed on Jul. 1, 2020, which claims priority to Korean Patent Application No. 10-2019-0109152 filed on Sep. 3, 2019, contents of both of which are incorporated herein by reference in their entireties.

BACKGROUND

Technical Field

An embodiment of the present disclosure relates to a pressure sensor.

Description of Related Technology

Conventional pressure sensors are coupled a general substrate or base material as a thin film in a plane so as to respond to contraction and relaxation of the base material depending on deformation thereof in order to sense the degree of bending or deformation of the base material.

SUMMARY

It is an object of an embodiment of the present disclosure to provide a pressure sensor freely applied to various flexible materials to effectively sense a change in external pressure.

It is another object of the present disclosure to perform pressure sensing based on various materials and shapes through structural application of conductive thread to the pressure sensor and structural change for effectively improving pressure sensing sensitivity of the conductive thread.

It is a further object of the present disclosure to effectively sense a change in capacitance as well as a change in resistance depending on external pressure while maintaining sensitivity, whereby the pressure sensor is effectively applicable to various emerging fields, such as wearable materials.

A pressure sensor according to a first embodiment of the present disclosure includes a base material, a through-hole formed through the base material so as to extend from an upper surface to a lower surface thereof, and a conductive thread sensor including conductive thread extending through the through-hole.

Here, the conductive thread sensor may include a first signal line extending from one side of the base material, a sensing portion extending from the first signal line so as to extend from one surface of the base material to the other surface of the base material via an inside of the through-hole, and a second signal line extending from the sensing portion so as to extend to the other side of the base material.

In addition, the sensing portion may be formed in an inner space of the through-hole so as to be bent upwards and downwards a plurality of times, and the inner space of the through-hole and a space between the bent parts of the sensing portion bent the plurality of times may be filled with an insulating material configured to elastically support an upper part and a lower part of the through-hole.

In addition, an interior of the through-hole may be filled with conductive paste, the conductive paste being coupled to the sensing portion and elastically supported in an upward-downward direction of the base material.

In addition, the pressure sensor may further include a bump coupled to the one surface of the base material so as to cover the through-hole, the bump being convex upwards.

In addition, the sensing portion may be formed so as to have higher resistance than the first signal line and the second signal line.

In addition, the sensing portion may be made of an insulating material.

A pressure sensor according to a second embodiment of the present disclosure includes a base material, a first through-hole and a second through-hole formed on one surface of the base material, the first through-hole and the second through-hole being formed through the base material so as to extend from an upper surface to a lower surface thereof, and a conductive thread sensor, the conductive thread sensor including a first signal line extending from one side of the base material, a sensing portion extending from the first signal line so as to continuously extend from the one surface of the base material via the first through-hole and the second through-hole, the sensing portion being coupled to the first through-hole and the second through-hole, and a second signal line extending from the sensing portion so as to extend to the other side of the base material.

Here, the sensing portion may extend through the first through-hole and the second through-hole and may be formed so as to be wound a plurality of times between the first through-hole and the second through-hole.

In addition, an interior of each of the first through-hole and the second through-hole may be filled with conductive paste, the conductive paste being coupled to the sensing portion and configured to elastically support an upper part and a lower part of the sensing portion.

In addition, the pressure sensor may further include a first bump coupled to the one surface of the base material so as to cover the first through-hole, the first bump being formed so as to be convex upwards, and a second bump coupled to the one surface of the base material so as to cover the second through-hole, the second bump being formed so as to be convex upwards.

In addition, the sensing portion may be formed so as to have higher resistance than the first signal line and the second signal line.

In addition, the sensing portion may be made of an insulating material.

A pressure sensor according to a third embodiment of the present disclosure includes a base material, a plurality of through-holes formed on one surface of the base material, the plurality of through-holes being formed through the base material so as to extend from an upper surface to a lower surface thereof, and a conductive thread sensor, the conductive thread sensor including a first signal line extending from one side of the base material, a sensing portion extending from the first signal line so as to continuously extend from the one surface of the base material via the plurality of through-holes, the sensing portion being coupled to the plurality of through-holes, and a second signal line extending from the sensing portion so as to extend to the other side of the base material.

Here, the sensing portion may continuously extend through the plurality of through-holes, may be coupled to the plurality of through-holes, and may be coupled so as to be wound a plurality of times between adjacent ones of the through-holes.

In addition, an interior of each of the plurality of through-holes may be filled with conductive paste, the conductive paste being coupled to the sensing portion and elastically supported in an upward-downward direction of the base material.

In addition, the pressure sensor may further include a plurality of bumps coupled to the one surface of the base material so as to cover the plurality of through-holes, each of the plurality of bumps being formed so as to be convex upwards.

In addition, the sensing portion may be formed so as to have higher resistance than the first signal line and the second signal line.

In addition, the sensing portion may be made of an insulating material.

A pressure sensor according to a fourth embodiment of the present disclosure includes a base material, a through-hole formed on one surface of the base material, the through-hole being formed through the base material so as to extend from an upper surface to a lower surface thereof, a first signal line extending from one side of the base material, a first electrode portion extending from the first signal line so as to extend through the through-hole from the one surface of the base material and to be coupled to one side of an inner circumferential surface of the through-hole, a second signal line extending from the other side of the base material, a second electrode portion extending from the second signal line so as to extend through the through-hole from the one surface of the base material and to be coupled to the other side of the inner circumferential surface of the through-hole, the second electrode portion being spaced apart from the first electrode portion while facing the first electrode portion, and a dielectric substance, with which a space between the first electrode portion and the second electrode portion is filled.

The features and advantages of the present disclosure will be more clearly understood from the following detailed description taken in conjunction with the accompanying drawings.

It should be understood that the terms used in the specification and appended claims should not be construed as being limited to general and dictionary meanings, but should be construed based on meanings and concepts according to the spirit of the present disclosure on the basis of the principle that the inventor is permitted to define appropriate terms for the best explanation.

According to an embodiment of the present disclosure, a pressure sensor is implemented through structural coupling between conductive thread and a base material, whereby it is possible to achieve application to a variety of recent wearable flexible materials, to effectively respond to deformation of a base material itself, and to effectively increase the degree of design freedom.

In addition, it is possible to stably respond to structural deformation in application to various flexible materials and to effectively improve sensitivity in pressure sensing through a coupling structure with the flexible material.

In addition, it is possible to implement a pressure sensor capable of measuring a change in capacitance as well as a change in resistance for pressure sensing, whereby it is possible to improve reliability in pressure sensing in various environments appropriate for use.

In addition, it is possible to effectively sense pressure distribution depending on a change in various shapes or a change in movement based on application fields, in addition to simple pressure sensing, whereby it is possible to effectively monitor the behavior of people during working in various environments.

In addition, it is possible to implement a point structure for partial pressure sensing as a bump, in addition to implementation of the pressure sensor through conductive thread, whereby it is possible to transfer overall pressure to an effective sensing point, and therefore it is possible to more effectively improve accuracy and reliability in pressure sensing.

DETAILED DESCRIPTION

Figure 1A:
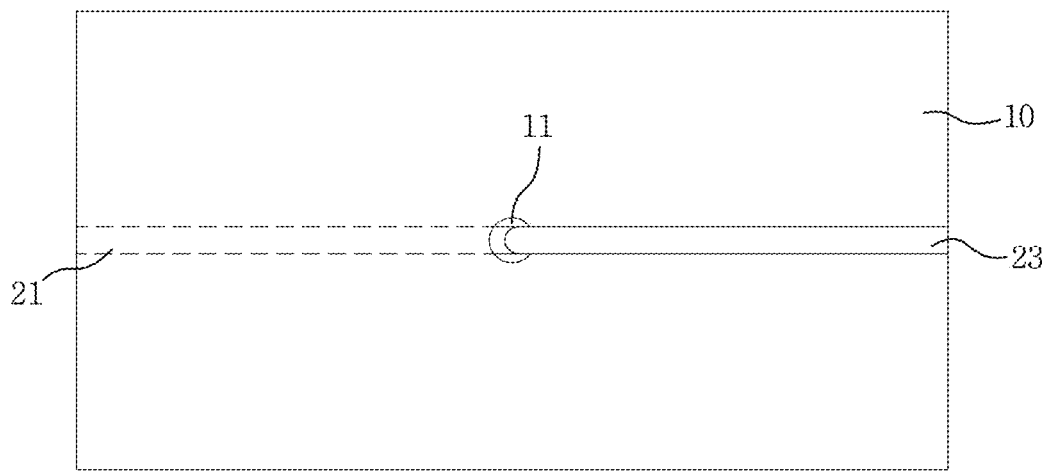
FIGS. 1A, 1B, and 1C are respectively a plan view, a sectional view, and another sectional view of a pressure sensor according to a first embodiment of the present disclosure.

With a recent increase in forming sensors using various base materials, such as a general flexible substrate, a fiber material, and structures having great degree of deformation, research on a pressure sensor capable of effectively responding to deformation of the base material itself and having high application flexibility has inevitably emerged.

Objects, specific advantages, and novel features of an embodiment of the present disclosure will be apparent from exemplary embodiments and the following detailed description in connection with the accompanying drawings. It should be noted that when reference numerals are assigned to the elements of the drawings, the same reference numeral is assigned to the same elements even when they are illustrated in different drawings. Furthermore, the terms "one surface", "the other surface", "first", "second", etc. are only used to distinguish one element from another element, and these elements are not to be construed as being limited by these terms. In the following description of an embodiment of the present disclosure, a detailed description of known technology incorporated herein will be omitted when it may obscure the subject matter of an embodiment of the present disclosure.

Hereinafter, an embodiment of the present disclosure will be described in detail with reference to the accompanying drawings, and the same reference numerals indicate the same members.

Figure 1B:
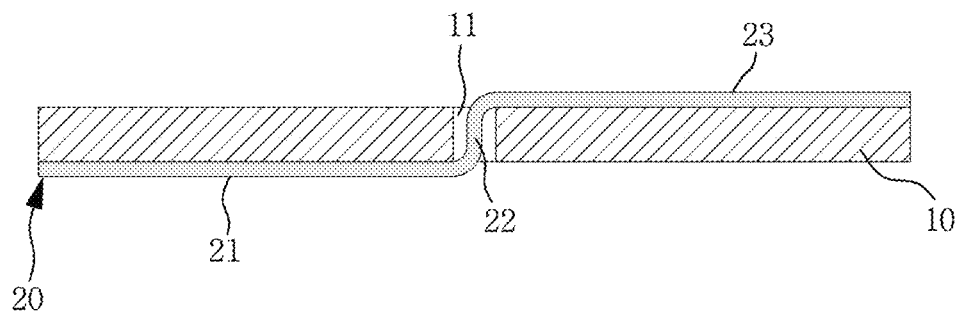
Figure 1C:
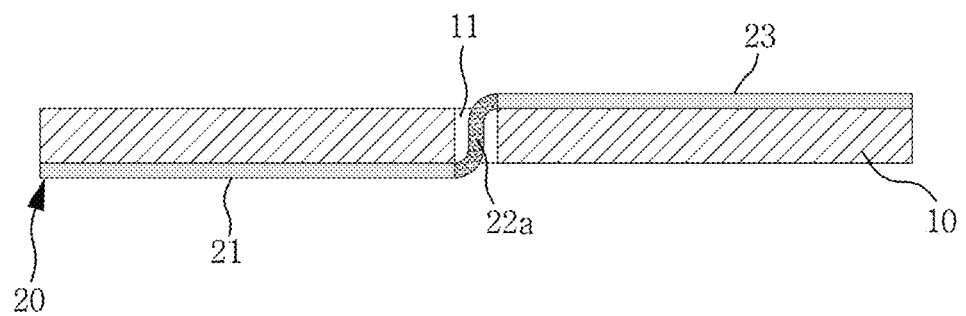
Figure 2:
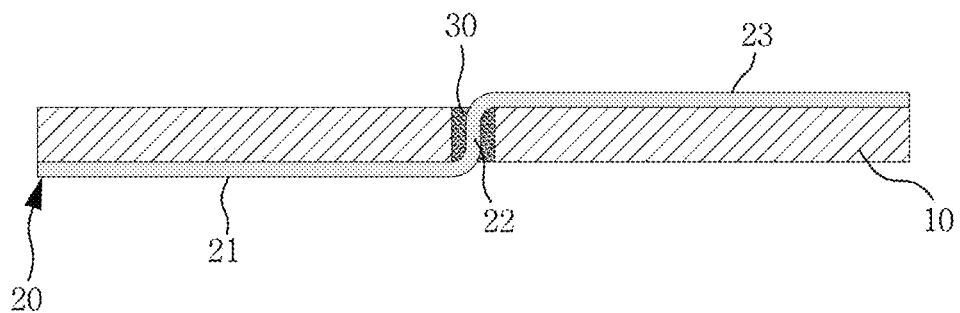
FIG. 2 is a sectional view of a modification of the pressure sensor according to the first embodiment of the present disclosure.
Figure 3:
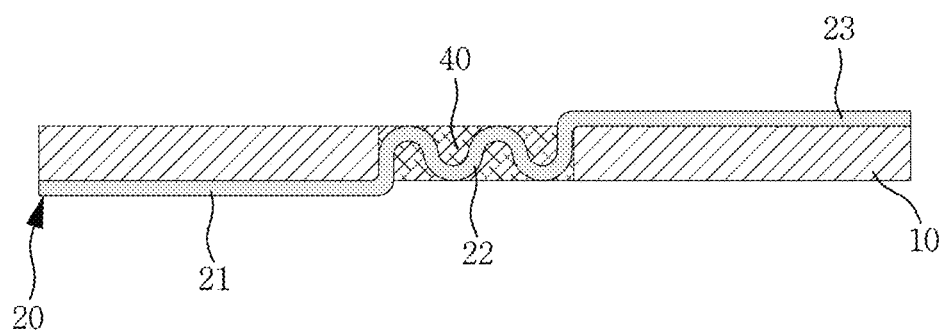
FIG. 3 is a sectional view of another modification of the pressure sensor according to the first embodiment of the present disclosure.
Figure 4:
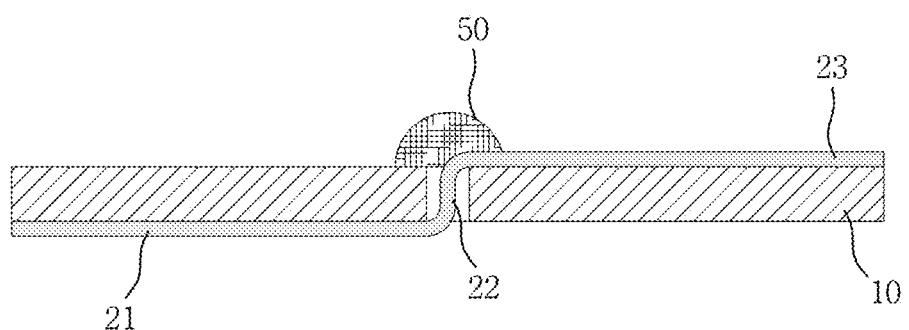
FIG. 4 is a sectional view of an example in which a bump is coupled to the pressure sensor according to the first embodiment of the present disclosure.

FIGS. 1A, 1B, and 1C are respectively a plan view, a sectional view, and another sectional view of a pressure sensor according to a first embodiment of the present disclosure, FIG. 2 is a sectional view of a modification of the pressure sensor according to the first embodiment of the present disclosure, FIG. 3 is a sectional view of another modification of the pressure sensor according to the first embodiment of the present disclosure, and FIG. 4 is a sectional view of an example in which a bump 50 is coupled to the pressure sensor according to the first embodiment of the present disclosure.

The pressure sensor according to the first embodiment of the present disclosure includes a base material 10, a through-hole 11 formed through the base material 10 so as to extend from the upper surface to the lower surface thereof, and a conductive thread sensor 20, the conductive thread sensor including a first signal line 21 extending from one side of the base material 10, a sensing portion 22 extending from the first signal line 21 so as to extend from one surface of the base material 10 to the other surface of the base material 10 via the inside of the through-hole 11, and a second signal line 23 extending from the sensing portion 22 so as to extend to the other side of the base material 10.

As shown in FIG. 1A, the through-hole 11 is formed in the base material 10, and the sensing portion 22 is coupled to the through-hole 11 in an upward-downward direction, i.e., through the base material 10 from the upper surface to the lower surface thereof in a thickness direction thereof.

The base material 10 means a general flexible material, and may be a fiber material or a flexible material having any of various shapes. With universalization of wearable devices, pressure sensing based on the form of clothes, which people wear, or various other forms is necessary, and therefore technology for applying pressure sensors capable of effectively corresponding to deformation of the base material 10, which is flexible, is required.

The pressure sensor according to the embodiment of the present disclosure may be implemented as a pressure sensor using conductive thread. The conductive thread may be made of a conductive composite fiber material, or flexible line type conductive thread may be manufactured through printing of conductive ink or conductive coating. The conductive thread has a structural advantage in that the degree of freedom in flexible structural deformation of the conductive thread is high, whereby it is possible to effectively sense pressure in response to flexible structural deformation of the base material 10 without being broken thereby.

The conductive thread sensor 20 is formed so as to include the first signal line 21, which extends from one side of the base material 10 so as to serve to perform electrical connection, the sensing portion 22, which is coupled to the through-hole 11 of the base material 10 so as to sense pressure based on a change in resistance through deformation corresponding to actual pressure, and the second signal line 23 extending from the sensing portion 22 to the other side of the base material 10 so as to perform electrical connection.

The reason that the through-hole 11 is formed and the conductive thread is coupled in a direction in which the conductive thread extends through the through-hole 11 is that vertical deformation, not horizontal deformation, of the conductive thread is induced in response to pressure, whereby it is possible to improve sensing sensitivity.

Here, as shown in FIG. 1C, only the conductive thread part of the sensing portion 22 (22a) extending through the through-hole 11 may be made of conductive thread having higher resistance than the other part, or only the sensing portion 22 may be made of an insulating material. For example, the sensing portion 22 (22a) of the conductive thread sensor 20 may be coated with insulation, or in the case in which a material from which conductive thread is manufactured is an insulating material, only the first and second signal lines 21 and 23 may be coated with metal, whereby the conductive thread part of the sensing portion 22 (22a) may be maintained as an insulating material. In this case, it is possible to further improve sensing sensitivity of the sensing portion 22 (22a) of the conductive thread sensor 20.

In addition, as shown in FIG. 2, the interior of the through-hole 11 may be filled with a material that is effectively elastically supported with respect to external pressure, such as conductive paste 30, in addition to the sensing portion 22 made of conductive thread, whereby a change in resistance may be increased, and therefore, it is possible to improve sensitivity in pressure sensing.

In FIG. 3, the sensing portion 22 of the conductive thread sensor 20 may be inserted into the through-hole 11 of the base material 10 in a curved state so as to be bent upwards and downwards a plurality of times, whereby it is possible to further improve sensitivity in pressure sensing. The interior of the through-hole may be filled with an insulating material configured to maintain electrical insulation between the bent parts of the sensing portion 22, such as a dielectric substance 40. It is appropriate to select a material capable of elastically responding to external pressure as the insulating material and to adjust the filling rate of the insulating material.

FIG. 4 shows that the bump 50 is coupled to the upper surface of the through hole 11 of the base material 10 so as to be convex upwards in order to cover the upper surface of the through hole. In the case in which the bump 50 is coupled to the upper surface of the through hole so as to be convex upwards, pressure applied to the upper surface of the through hole may be effectively transferred to the sensing portion 22 through the bump 50, whereby it is possible to secure accuracy in pressure sensing. The bump 50 may be made of an insulating material. For example, various materials, such as epoxy, may be used. However, it is appropriate to manufacture the bump so as to have elastic force or supporting force necessary to effectively transfer pressure and to couple the bump to the base material 10.

Figure 5A:
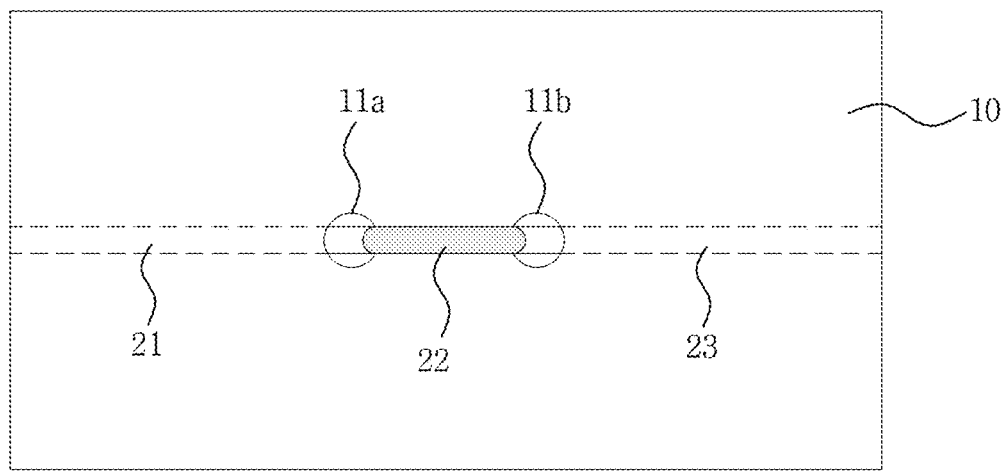
FIGS. 5A and 5B are respectively a plan view and a sectional view of a pressure sensor according to a second embodiment of the present disclosure.
Figure 5B:
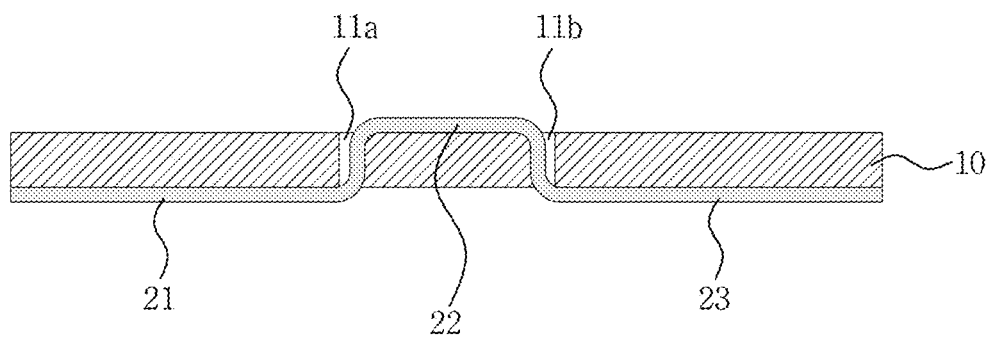
Figure 6:
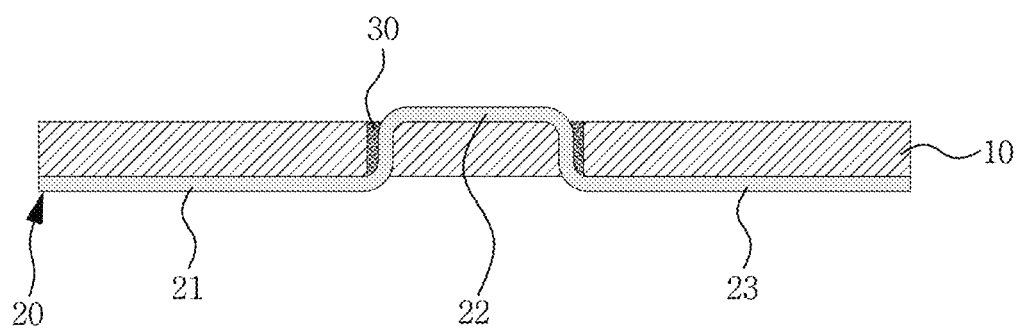
FIG. 6 is a sectional view of a modification of the pressure sensor according to the second embodiment of the present disclosure.
Figure 7A:
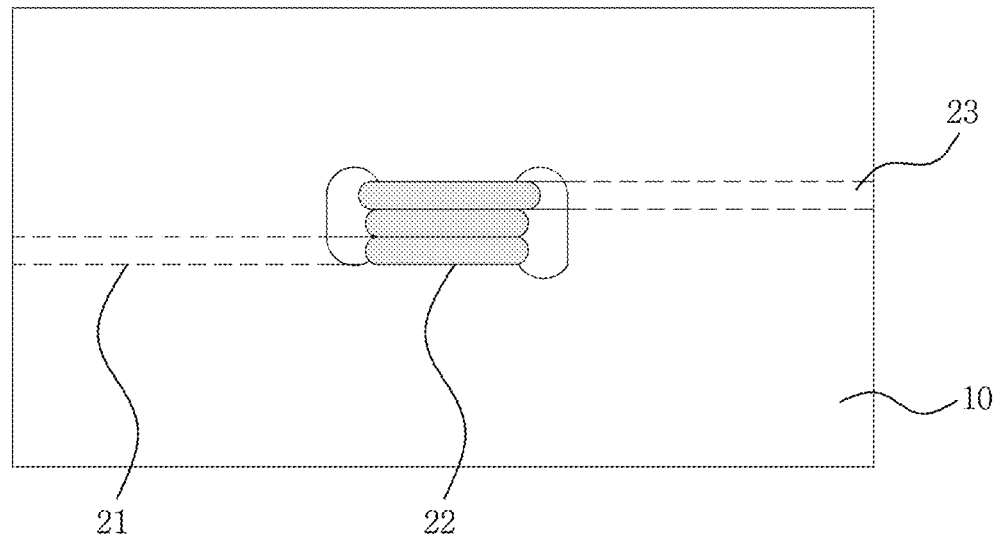
FIGS. 7A and 7B are sectional views of another modification of the pressure sensor according to the second embodiment of the present disclosure.
Figure 7B:
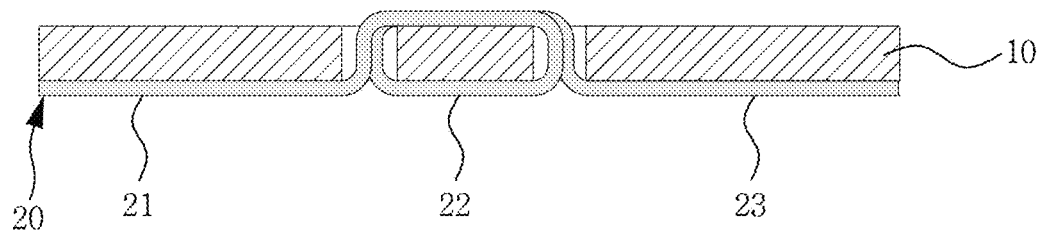
Figure 8:
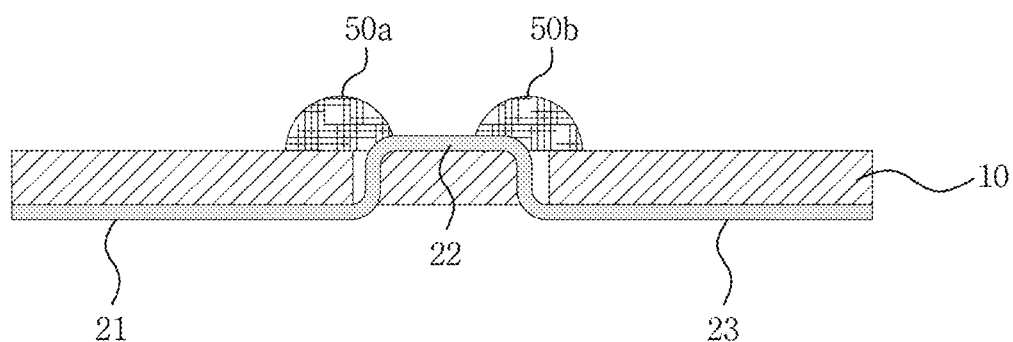
FIG. 8 is a sectional view of an example in which a bump is coupled to the pressure sensor according to the second embodiment of the present disclosure.

FIGS. 5A and 5B are respectively a plan view and a sectional view of a pressure sensor according to a second embodiment of the present disclosure, FIG. 6 is a sectional view of a modification of the pressure sensor according to the second embodiment of the present disclosure, FIGS. 7A and 7B are a sectional view of another modification of the pressure sensor according to the second embodiment of the present disclosure, and FIG. 8 is a sectional view of an example in which a bump is coupled to the pressure sensor according to the second embodiment of the present disclosure.

The pressure sensor according to the second embodiment of the present disclosure includes a base material 10, a first through-hole 11a and a second through-hole 11b formed on one surface of the base material 11, the first through-hole and the second through-hole being formed through the base material 10 so as to extend from the upper surface to the lower surface thereof, and a conductive thread sensor 20, the conductive thread sensor including a first signal line 21 extending from one side of the base material 10, a sensing portion 22 extending from the first signal line 21 so as to continuously extend from one surface of the base material 10 via the first through-hole 11a and the second through-hole 11b, the sensing portion being coupled to the first through-hole and the second through-hole, and a second signal line 23 extending from the sensing portion 22 so as to extend to the other side of the base material 10.

As shown in FIG. 5, the pressure sensor according to the second embodiment of the present disclosure has a structure in which the two through-holes 11, i.e., the first through-hole 11a and the second through-hole 11b, are formed in the base material 10 and the conductive thread sensor 20 is coupled to the first through-hole and the second through-hole.

The second embodiment of the present disclosure is different from the first embodiment of the present disclosure in that the conductive thread sensor is coupled to the first through-hole 11a and the second through-hole 11b and that the conductive thread sensor is wound a plurality of times around the base material 10 between the first through-hole 11a and the second through-hole 11b, whereby deformation of the base material 10 by pressure in a vertical direction may be increased, and therefore it is possible to further improve pressure sensing sensitivity.

As shown in FIG. 6, the interiors of the first through-hole 11a and the second through-hole 11b are filled with conductive paste 30, which is coupled to the sensing portion 22 of the conductive thread sensor 20, which is identical in structure to the first embodiment of the present disclosure, and therefore a detailed description thereof will be omitted.

As shown in FIGS. 7A and 7B, the sensing portion 22 may be alternately wound a plurality of times through the first through-hole 11a and the second through-hole 11b. In this case, the conductive thread parts of the sensing portion 22 wound a plurality of times may be wound in the same plane in a state of being spaced apart from each other so as to be insulated from each other, and may be wound a plurality of times in a coil shape.

In FIG. 8, a first bump 50a and a second bump 50b are formed so as to cover the first through-hole 11a and the second through-hole 11b, respectively, whereby it is possible to concentrate pressure of the base material 10 on the sensing portion 22, and therefore it is possible to improve accuracy and reliability in pressure sensing through this structural design, in the same manner as in the first embodiment.

Even in this embodiment, the sensing portion may be made of an insulating material or may be formed so as to have higher resistance than the first and second signal lines 21 and 23, whereby it is possible to improve sensing sensitivity of the sensing portion 22 (22a), in the same manner as in FIG. 1C. A duplicate description thereof will be omitted.

Figure 9:
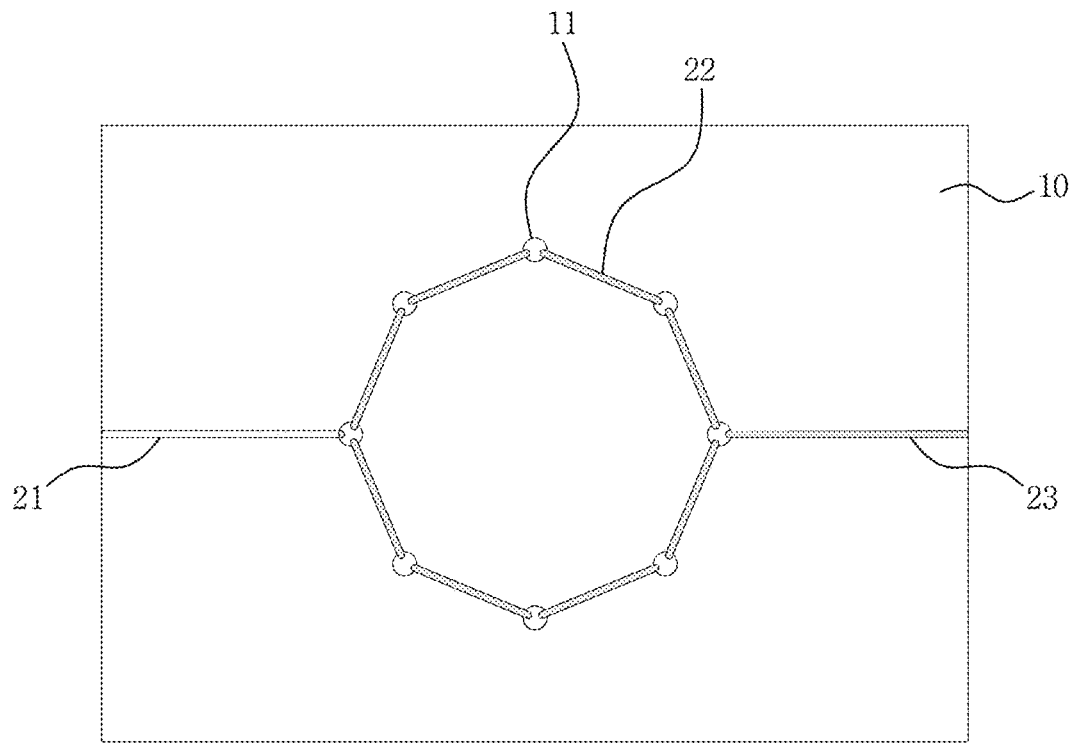
FIG. 9 is a plan view of a pressure sensor according to a third embodiment of the present disclosure.
Figure 10:
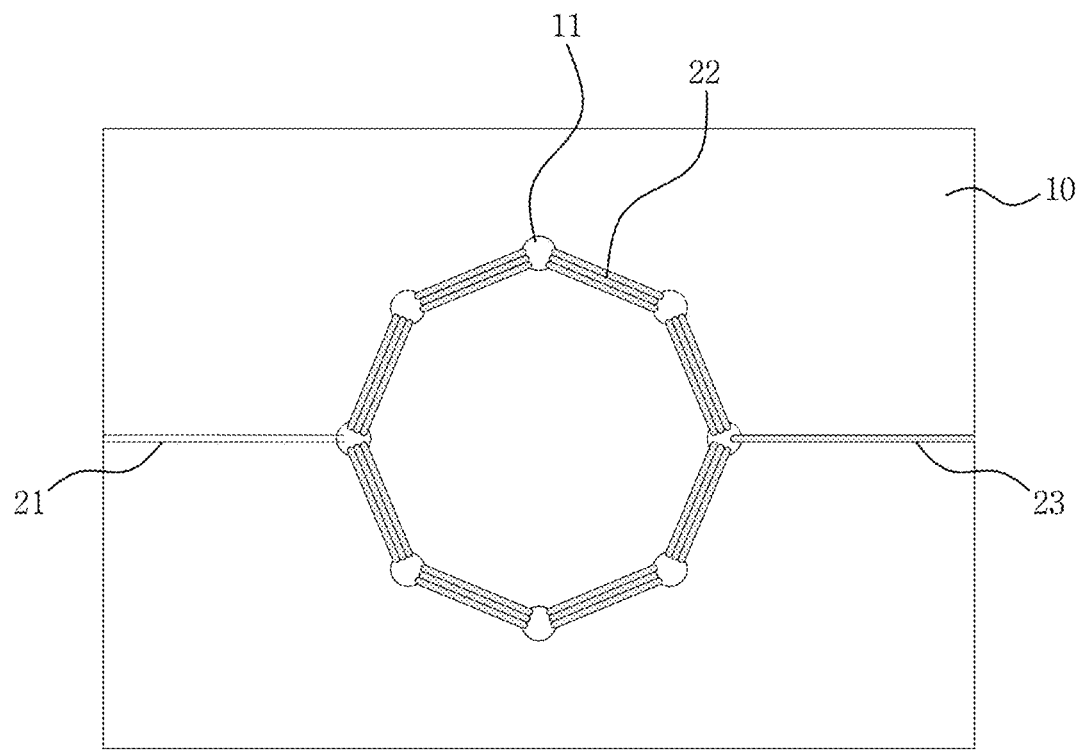
FIG. 10 is a plan view of a modification of the pressure sensor according to the third embodiment of the present disclosure.

FIG. 9 is a plan view of a pressure sensor according to a third embodiment of the present disclosure, and FIG. 10 is a plan view of a modification of the pressure sensor according to the third embodiment of the present disclosure.

As shown in FIGS. 9 and 10, in the third embodiment of the present disclosure, a plurality of through-holes 11 is formed in a base material 10, and conductive thread parts of a sensing portion of a conductive thread sensor 20 are wound once or a plurality of times so as to be connected to each other while extending through the through-holes 11, whereby it is possible to secure sensing sensitivity and a sensing region of the conductive thread sensor. The third embodiment of the present disclosure is identical in construction to the first embodiment and the second embodiment of the present disclosure, and therefore a detailed description thereof will be omitted.

Even in this embodiment, the sensing portion 22 (22a) may be made of an insulating material or may be formed so as to have higher resistance than the first and second signal lines 21 and 23, whereby it is possible to improve sensing sensitivity of the sensing portion 22 (22a), in the same manner as in FIG. 1C.

Figure 11A:
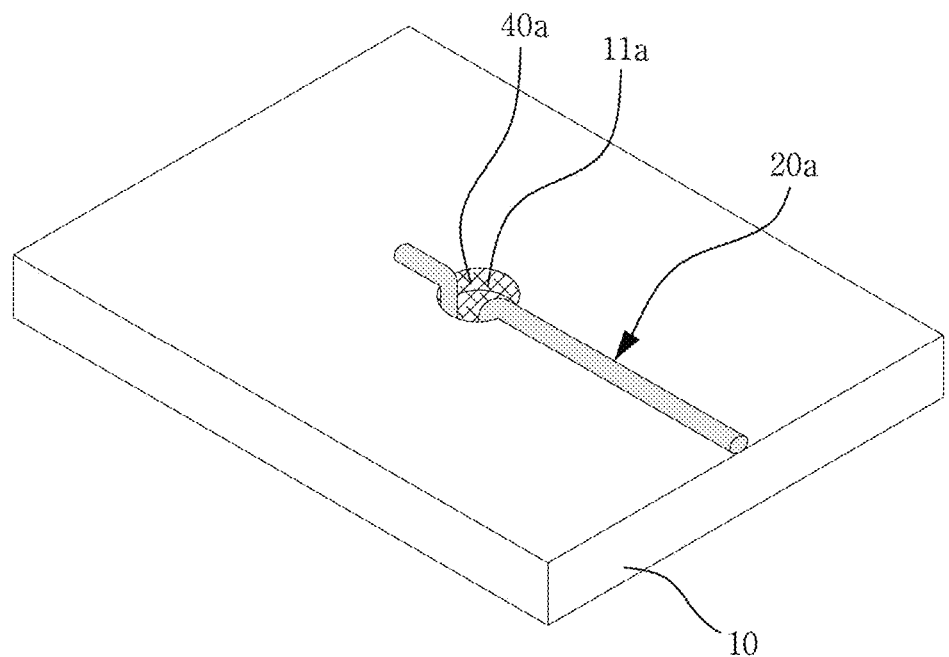
FIGS. 11A and 11B are respectively a plan view and a sectional view of a pressure sensor according to a fourth embodiment of the present disclosure.
Figure 11B:
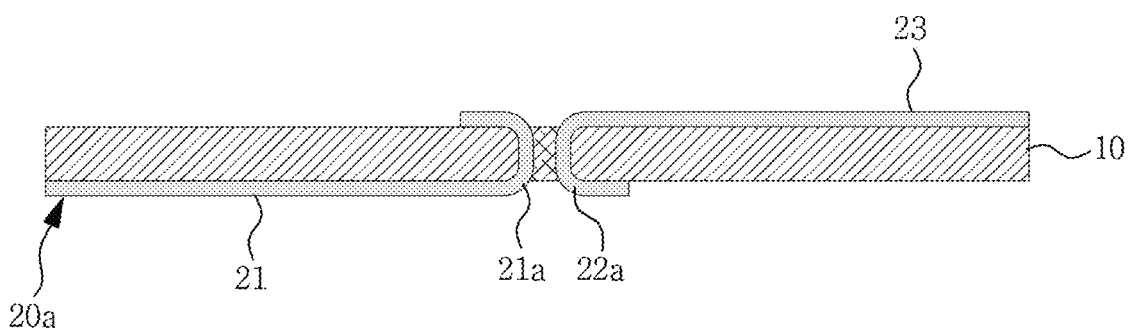

FIGS. 11A and 11B are respectively a plan view and a sectional view of a pressure sensor according to a fourth embodiment of the present disclosure.

The pressure sensor according to the fourth embodiment of the present disclosure shown in FIGS. 11A and 11B includes a base material 10, a through-hole 11a formed on one surface of the base material, the through-hole being formed through the base material 10 so as to extend from the upper surface to the lower surface thereof, and a conductive thread sensor 20a which comprises a first signal line 21 extending from one side of the base material 10, a first electrode portion 21a extending from the first signal line 21 so as to extend through the through-hole 11a from one surface of the base material 10 and to be coupled to one side of the inner circumferential surface of the through-hole, a second signal line 23 extending from the other side of the base material 10, and a second electrode portion 22a extending from the second signal line 23 so as to extend through the through-hole 11a from one surface of the base material 10 and to be coupled to the other side of the inner circumferential surface of the through-hole, the second electrode portion being spaced apart from the first electrode portion 21a while facing the first electrode portion, and a dielectric substance 40a, with which a space between the first electrode portion 21a and the second electrode portion 22a is filled.

As shown in FIGS. 11A and 11B, in the fourth embodiment of the present disclosure, there is shown that pressure is sensed through a change in capacitance depending on deformation by pressure. That is, the first electrode portion 21a is formed so as to be coupled to one side of the inner circumferential surface of the through-hole 11 of the base material 10, the first signal line 21 is formed so as to extend from the first electrode portion 21a for electrical connection, the second electrode portion 23a is formed so as to be coupled to the other side of the inner circumferential surface of the through-hole 11, the second electrode portion being disposed so as to face the first electrode portion 21a, and the second signal line 23 is formed so as to extend to the other side of the base material 10 for electrical connection of the second electrode portion 23a.

The space between the first electrode portion 21a and the second electrode portion 23a is filled with a dielectric substance, whereby it is possible to sense a change in external pressure and a pressure value thereof through a change in capacitance depending on a change in distance between the first electrode portion 21a and the second electrode portion 23a.

Only one example is shown, and therefore it is possible to implement various capacitance measurement structures based on the above-described capacitance measurement structure.

Also, in the case in which a plurality of through-holes 11 is formed, as in the third embodiment of the present disclosure, it is possible to simultaneously sense a change in capacitance as well as a change in resistance value depending on pressure through the plurality of through-holes 11, whereby it is possible to improve overall sensing sensitivity and reliability of the pressure sensor and to perform effective design change based on various environments and uses to which the present disclosure is applied.

Figure 12:
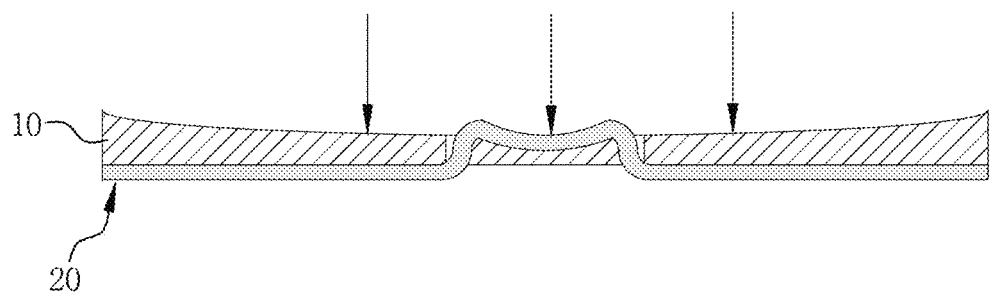
FIG. 12 is a schematic view showing the operation of the pressure sensor according to the second embodiment of the present disclosure.

Finally, FIG. 12 schematically shows that the sensing portion 22 of the conductive thread sensor 20 is deformed together with the base material 10 when pressure is applied to the pressure sensor according to the present disclosure from above. Such a pressure sensor using conductive thread is capable of measuring electrical resistance and capacitance depending on the structure thereof and the kind of a filling material, and it is possible to maximize a change of the resistance value and the capacitance value through contraction and relaxation of the sensing portion 22 coupled so as to extend through the through-hole 11 in the vertical direction depending on deformation of the base material by external pressure, whereby it is possible to improve reliability of the measured values.

Although the present disclosure has been described in detail with reference to specific embodiments, those embodiments are provided only for illustrative purposes. Therefore, the pressure sensor according to the present disclosure is not limited to those embodiments, but rather those skilled in the art will appreciate that various modifications, additions and substitutions are possible, without departing from the scope and spirit of the invention as disclosed in the accompanying claims. Simple changes and modifications of the present disclosure are to be appreciated as being included in the scope and spirit of the invention, and the protection scope of the present disclosure will be defined by the accompanying claims.

What is claimed is:

1. A pressure sensor comprising:
    a base material comprising an upper surface and a lower surface opposing the upper surface in a thickness direction of the base material;
    a through-hole formed through the base material so as to extend from the upper surface to the lower surface in the thickness direction of the base material, the base material comprising a first portion and a second portion disposed on opposing sides of the through-hole; and
    a sensing thread extending through the through-hole,
    wherein the sensing thread comprises:
        a first signal line extending along the lower surface of the first portion of the base material,
        a second signal line extending along the upper surface of the second portion of the base material, and
        two or more sensing portions disposed in the through-hole, each of the two or more sensing portions extending in the thickness direction of the base material in the through-hole, the two or more sensing portions being connected to the first signal line and the second signal line, and
    wherein in response to the base material being deformed by a pressure applied thereto, the two or more sensing portions are configured to:
        be deformed together with the base material, which causes a change in electrical resistance or capacitance of the sensing thread, and
        measure the pressure based on the change in the electrical resistance or capacitance of the sensing thread.

2. The pressure sensor according to claim 1, wherein:
    an inner space of the through-hole is filled with an insulating material configured to elastically support an upper part and a lower part of the through-hole.

3. The pressure sensor according to claim 1, wherein an interior of the through-hole is filled with conductive paste, the conductive paste being coupled to the two or more sensing portions and elastically supported in an upward-downward direction of the base material.

4. The pressure sensor according to claim 1, further comprising a bump coupled to one of the upper or lower surface of the base material so as to cover the through-hole, the bump being convex upwards.

5. The pressure sensor according to claim 1, wherein each sensing portion is formed so as to have higher resistance than the first signal line and the second signal line.

6. The pressure sensor according to claim 1, wherein each sensing portion is made of an insulating material.

7. A pressure sensor comprising:
    a base material comprising an upper surface and a lower surface opposing the upper surface in a thickness direction of the base material;
    a first through-hole and a second through-hole formed through the base material so as to extend from the upper surface to the lower surface in the thickness direction of the base material, the base material comprising:
        a first portion, a second portion, and a third portion disposed between the first and second portions,
        the first portion and the third portion disposed on opposing sides of the first through-hole, and
        the third portion and the second portion disposed on opposing sides of the second through-hole; and
    a sensing thread comprising:
        a first signal line extending along the lower surface of the first portion of the base material,
        a second signal line extending along the lower surface of the second portion of the base material,
        first two or more sensing portions disposed in the first through-hole, each of the first two or more sensing portions extending in the thickness direction of the base material in the first through-hole, the first two or more sensing portions being electrically connected to the first signal line and the second signal line, and
        second two or more sensing portions disposed in the second through-hole, each of the second two or more sensing portions extending in the thickness direction of the base material in the second through-hole, the second two or more sensing portions being electrically connected to the first signal line and the second signal line,
    wherein in response to the base material being deformed by a pressure applied thereto, the first and second two or more sensing portions are configured to:
        be deformed together with the base material, which causes a change in electrical resistance or capacitance of the sensing thread, and
        measure the pressure based on the change in the electrical resistance or capacitance of the sensing thread.

8. The pressure sensor according to claim 7, wherein the sensing thread extends through the first through-hole and the second through-hole and is formed so as to be wound a plurality of times between the first through-hole and the second through-hole.

9. The pressure sensor according to claim 7, wherein an interior of each of the first through-hole and the second through-hole is filled with conductive paste, the conductive paste being coupled to the first and second two or more sensing portions and configured to elastically support an upper part and a lower part of each sensing portion.

10. The pressure sensor according to claim 7, further comprising:
a first bump coupled to one of the upper or lower surface of the base material so as to cover the first through-hole, the first bump being formed so as to be convex upwards; and
a second bump coupled to one of the upper or lower surface of the base material so as to cover the second through-hole, the second bump being formed so as to be convex upwards.

11. The pressure sensor according to claim 7, wherein each sensing portion is formed so as to have higher resistance than the first signal line and the second signal line.

12. The pressure sensor according to claim 7, wherein each sensing portion is made of an insulating material.

13. A pressure sensor comprising:
a base material comprising an upper surface and a lower surface opposing the upper surface in a thickness direction of the base material;
a plurality of through-holes formed through the base material so as to extend from the upper surface to the lower surface in the thickness direction of the base material, the base material comprising a first portion and a second portion disposed on opposing sides of the plurality of through-holes; and
a sensing thread comprising:
a first signal line extending along the lower surface of the first portion of the base material,
a second signal line extending along the upper surface of the second portion of the base material, and
two or more sensing portions disposed in at least one of the plurality of through-holes, each of the two or more sensing portions extending in the thickness direction of the base material in the at least one of the plurality of through-holes, the two or more sensing portions being electrically connected to the first signal line and the second signal line,
wherein in response to the base material being deformed by a pressure applied thereto, the two or more sensing portions are configured to:
be deformed together with the base material, which causes a change in electrical resistance or capacitance of the sensing thread, and
measure the pressure based on the change in the electrical resistance or capacitance of the sensing thread.

14. The pressure sensor according to claim 13, wherein the sensing thread continuously extends through the plurality of through-holes so as to be wound a plurality of times between adjacent ones of the through-holes.

15. The pressure sensor according to claim 13, wherein an interior of each of the plurality of through-holes is filled with conductive paste, the conductive paste being coupled to the two or more sensing portions and elastically supported in an upward-downward direction of the base material.

16. The pressure sensor according to claim 13, further comprising a plurality of bumps coupled to one of the upper or lower surface of the base material so as to cover the plurality of through-holes, each of the plurality of bumps being formed so as to be convex upwards.

17. The pressure sensor according to claim 13, wherein each sensing portion is formed so as to have higher resistance than the first signal line and the second signal line.

18. The pressure sensor according to claim 13, wherein each sensing portion is made of an insulating material.

19. A pressure sensor comprising:
a base material comprising an upper surface and a lower surface opposing the upper surface in a thickness direction of the base material;
a through-hole formed through the base material so as to extend from the upper surface to the lower surface in the thickness direction of the base material, the base material comprising a first portion and a second portion disposed on opposing sides of the through-hole, the through-hole comprising an inner circumferential surface;
a first sensing thread comprising:
a first signal line extending along the lower surface of the first portion of the base material, and
a first electrode portion extending from the first signal line so as to extend through the through-hole from the upper surface or the lower surface of the base material and to be coupled to one side of the inner circumferential surface of the through-hole;
a second sensing thread comprising:
a second signal line extending along the upper surface of the second portion of the base material, and
a second electrode portion extending from the second signal line so as to extend through the through-hole from the upper surface or the lower surface of the base material and to be coupled to the other side of the inner circumferential surface of the through-hole, the second electrode portion being spaced apart from the first electrode portion while facing the first electrode portion; and
a dielectric substance, with which a space between the first electrode portion and the second electrode portion is filled,
wherein the base material is configured to be deformed by a pressure applied thereto, which causes a change in capacitance between the first sensing thread and the second sensing thread, and
wherein the first sensing thread and the second sensing thread are configured to measure the pressure based on the change in the capacitance thereof.

* * * * *